United States Patent
Abedini et al.

(10) Patent No.: US 12,323,220 B2
(45) Date of Patent: Jun. 3, 2025

(54) REPEATER CONFIGURATION FOR MULTI-HOP NETWORKS

(71) Applicant: QUALCOMM Incorporated, San Diego, CA (US)

(72) Inventors: Navid Abedini, Basking Ridge, NJ (US); Jianghong Luo, Skillman, NJ (US); Tommy Azzino, New York, NY (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 18/150,686

(22) Filed: Jan. 5, 2023

(65) Prior Publication Data

US 2024/0235657 A1    Jul. 11, 2024

(51) Int. Cl.
    *H04B 7/155*    (2006.01)
    *H04B 7/0426*   (2017.01)

(52) U.S. Cl.
    CPC ......... *H04B 7/15507* (2013.01); *H04B 7/043* (2013.01)

(58) Field of Classification Search
    CPC .. H04B 7/15507; H04B 7/043; H04B 7/0617; H04B 7/0695; H04B 7/15542; H04B 7/1555; H04B 7/15528; H04W 24/02; H04W 84/047; H04W 52/0203
    See application file for complete search history.

(56) References Cited

U.S. PATENT DOCUMENTS

| | | | |
|---|---|---|---|
| 2021/0306962 A1* | 9/2021 | Abedini | H04B 1/04 |
| 2022/0045742 A1* | 2/2022 | Abedini | H04W 72/0453 |
| 2023/0345262 A1* | 10/2023 | Park | H04W 16/28 |

FOREIGN PATENT DOCUMENTS

| | | |
|---|---|---|
| WO | 2021086582 | 5/2021 |
| WO | 2023070361 A1 | 5/2023 |

OTHER PUBLICATIONS

International Search Report and Written Opinion—PCT/US2023/081344—ISA/EPO—Mar. 14, 2024.

* cited by examiner

*Primary Examiner* — Hashim S Bhatti
(74) *Attorney, Agent, or Firm* — Harrity & Harrity LLP

(57) ABSTRACT

Various aspects of the present disclosure generally relate to wireless communication. In some aspects, a network node may receive first information identifying a set of supported configurations for a set of repeaters, the first information including resource information for the set of supported configurations. The network node may receive second information identifying a set of measurements of a network, the set of measurements being associated with use, on the network, of the set of supported configurations. The network node may transmit, to a repeater of the set of repeaters, third information identifying a configuration, of the set of supported configurations, that the repeater is to use for communication in the network, the configuration being based at least in part on the resource information and the set of measurements. Numerous other aspects are described.

30 Claims, 11 Drawing Sheets

REPEATER CONFIGURATION FOR MULTI-HOP NETWORKS

FIELD OF THE DISCLOSURE

Aspects of the present disclosure generally relate to wireless communication and to techniques and apparatuses for repeater configuration for multi-hop networks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
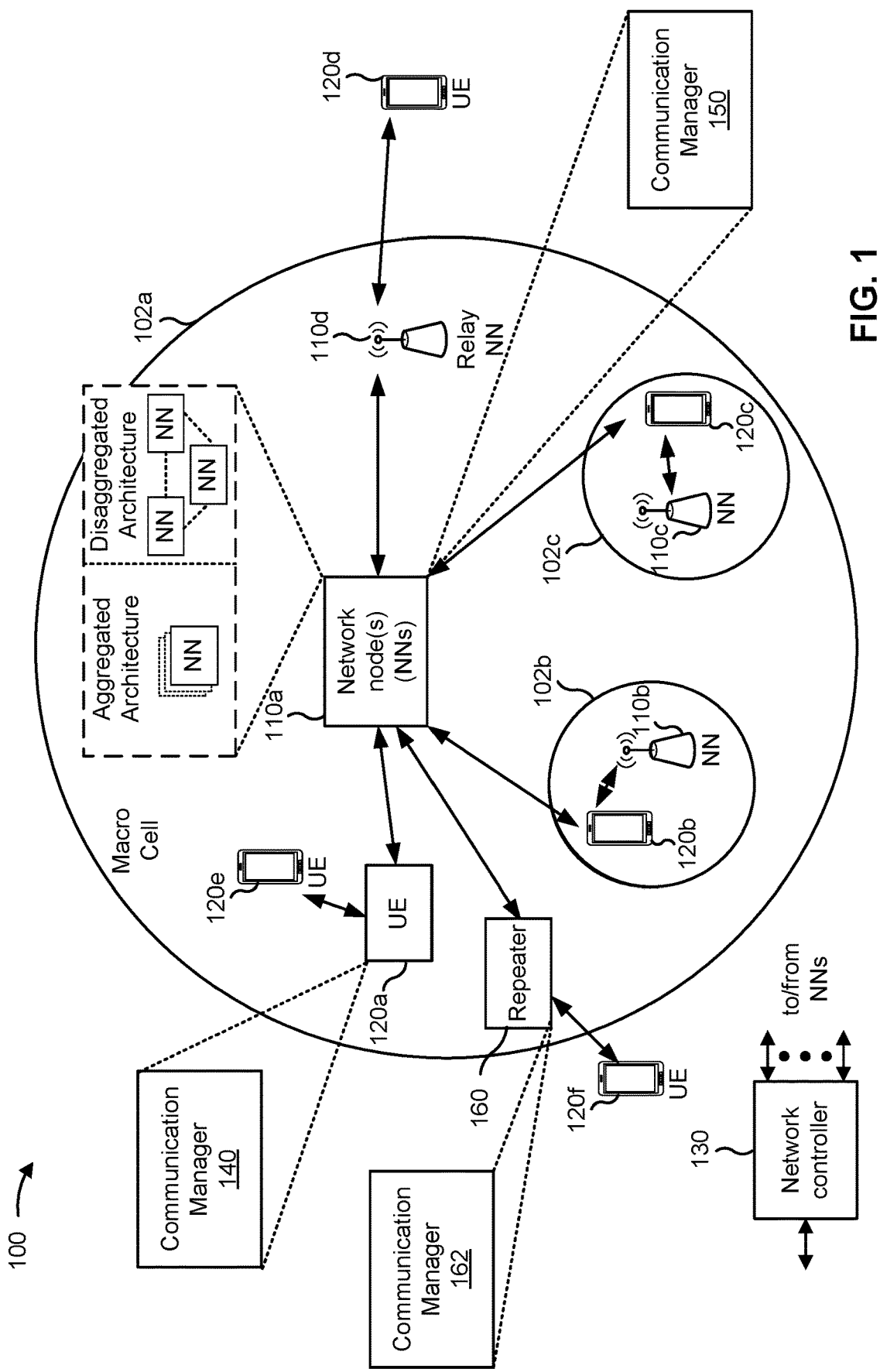
FIG. 1 is a diagram illustrating an example of a wireless network, in accordance with the present disclosure.

Some aspects described herein relate to a method of wireless communication performed by a network node. The method may include receiving first information identifying a set of supported configurations for a set of repeaters, the first information including resource information for the set of supported configurations. The method may include receiving second information identifying a set of measurements of a network, the set of measurements being associated with use, on the network, of the set of supported configurations. The method may include transmitting, to a repeater of the set of repeaters, third information identifying a configuration, of the set of supported configurations, that the repeater is to use for communication in the network, the configuration being based at least in part on the resource information and the set of measurements.

Some aspects described herein relate to a method of wireless communication performed by a repeater. The method may include transmitting first information identifying a set of supported configurations, the first information including resource information for the set of supported configurations. The method may include transmitting second information identifying a set of measurements of a network, the set of measurements being associated with use, on the network, of the set of supported configurations. The method may include receiving third information identifying a configuration, of the set of supported configurations, to use for communication in the network, the configuration being based at least in part on the resource information and the set of measurements.

Some aspects described herein relate to a method of wireless communication performed by a user equipment (UE). The method may include transmitting, to a network node and via a repeater, at least one of first information identifying a set of supported configurations of the repeater, the first information including resource information for the set of supported configurations or second information identifying a set of measurements of a network, the set of measurements being associated with use, on the network, of the set of supported configurations. The method may include communicating in the network using a configuration of the set of supported configurations and using the repeater, the configuration being based at least in part on the resource information and the set of measurements.

Some aspects described herein relate to a network node for wireless communication. The network node may include a memory and one or more processors coupled to the memory. The one or more processors may be configured to receive first information identifying a set of supported configurations for a set of repeaters, the first information including resource information for the set of supported configurations. The one or more processors may be configured to receive second information identifying a set of measurements of a network, the set of measurements being associated with use, on the network, of the set of supported configurations. The one or more processors may be configured to transmit, to a repeater of the set of repeaters, third information identifying a configuration, of the set of supported configurations, that the repeater is to use for communication in the network, the configuration being based at least in part on the resource information and the set of measurements.

Some aspects described herein relate to a repeater for wireless communication. The repeater may include a memory and one or more processors coupled to the memory. The one or more processors may be configured to transmit first information identifying a set of supported configurations, the first information including resource information for the set of supported configurations. The one or more processors may be configured to transmit second information identifying a set of measurements of a network, the set of measurements being associated with use, on the network, of the set of supported configurations. The one or more processors may be configured to receive third information identifying a configuration, of the set of supported configurations, to use for communication in the network, the configuration being based at least in part on the resource information and the set of measurements.

Some aspects described herein relate to a UE for wireless communication. The UE may include a memory and one or more processors coupled to the memory. The one or more processors may be configured to transmit, to a network node and via a repeater, at least one of first information identifying a set of supported configurations of the repeater, the first information including resource information for the set of supported configurations or second information identifying a set of measurements of a network, the set of measurements being associated with use, on the network, of the set of supported configurations. The one or more processors may be configured to communicate in the network using a configuration of the set of supported configurations and using the repeater, the configuration being based at least in part on the resource information and the set of measurements.

Some aspects described herein relate to a non-transitory computer-readable medium that stores a set of instructions for wireless communication by a network node. The set of instructions, when executed by one or more processors of the network node, may cause the network node to receive first information identifying a set of supported configurations for a set of repeaters, the first information including resource information for the set of supported configurations. The set of instructions, when executed by one or more processors of the network node, may cause the network node to receive second information identifying a set of measurements of a network, the set of measurements being associated with use, on the network, of the set of supported configurations. The set of instructions, when executed by one or more processors of the network node, may cause the network node to transmit, to a repeater of the set of repeaters, third information identifying a configuration, of the set of supported configurations, that the repeater is to use for communication in the network, the configuration being based at least in part on the resource information and the set of measurements.

Some aspects described herein relate to a non-transitory computer-readable medium that stores a set of instructions for wireless communication by a repeater. The set of instructions, when executed by one or more processors of the repeater, may cause the repeater to transmit first information identifying a set of supported configurations, the first information including resource information for the set of supported configurations. The set of instructions, when executed by one or more processors of the repeater, may cause the repeater to transmit second information identifying a set of measurements of a network, the set of measurements being associated with use, on the network, of the set of supported configurations. The set of instructions, when executed by one or more processors of the repeater, may cause the repeater to receive third information identifying a configuration, of the set of supported configurations, to use for communication in the network, the configuration being based at least in part on the resource information and the set of measurements.

Some aspects described herein relate to a non-transitory computer-readable medium that stores a set of instructions for wireless communication by a UE. The set of instructions, when executed by one or more processors of the UE, may cause the UE to transmit, to a network node and via a repeater, at least one of first information identifying a set of supported configurations of the repeater, the first information including resource information for the set of supported configurations or second information identifying a set of measurements of a network, the set of measurements being associated with use, on the network, of the set of supported configurations. The set of instructions, when executed by one or more processors of the UE, may cause the UE to communicate in the network using a configuration of the set of supported configurations and using the repeater, the configuration being based at least in part on the resource information and the set of measurements.

Some aspects described herein relate to an apparatus for wireless communication. The apparatus may include means for receiving first information identifying a set of supported configurations for a set of repeaters, the first information including resource information for the set of supported configurations. The apparatus may include means for receiving second information identifying a set of measurements of a network, the set of measurements being associated with use, on the network, of the set of supported configurations. The apparatus may include means for transmitting, to a repeater of the set of repeaters, third information identifying a configuration, of the set of supported configurations, that the repeater is to use for communication in the network, the configuration being based at least in part on the resource information and the set of measurements.

Some aspects described herein relate to an apparatus for wireless communication. The apparatus may include means for transmitting first information identifying a set of supported configurations, the first information including resource information for the set of supported configurations. The apparatus may include means for transmitting second information identifying a set of measurements of a network, the set of measurements being associated with use, on the network, of the set of supported configurations. The apparatus may include means for receiving third information identifying a configuration, of the set of supported configurations, to use for communication in the network, the configuration being based at least in part on the resource information and the set of measurements.

Some aspects described herein relate to an apparatus for wireless communication. The apparatus may include means for transmitting, to a network node and via a repeater, at least one of first information identifying a set of supported configurations of the repeater, the first information including resource information for the set of supported configurations or second information identifying a set of measurements of a network, the set of measurements being associated with use, on the network, of the set of supported configurations. The apparatus may include means for communicating in the network using a configuration of the set of supported configurations and using the repeater, the configuration being based at least in part on the resource information and the set of measurements.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a repeater 160 (e.g., millimeter wave (mmWave) repeater) may receive a signal (e.g., an analog millimeter wave signal) from a network node 110, may amplify the signal, and may transmit the amplified signal to one or more UEs 120 (e.g., shown as UE 120*f*). In some aspects, the repeater 160 may be an analog mmW repeater, sometimes referred to as a layer 1 mmW repeater. Additionally, or alternatively, the repeater 160 may be a wireless transmit receive point (TRP) acting as a distributed unit (e.g., of a 5G access node) that communicates wirelessly with a network node 110 acting as a central unit or an access node controller (e.g., of the 5G access node). The repeater 160 may receive, amplify, and transmit the analog signal without performing analog-to-digital conversion of the analog signal and/or without performing any digital signal processing on the analog signal. In this way, latency may be reduced and a cost to produce the repeater 160 may be reduced.

In some aspects, the network node 110 may include a communication manager 150. As described in more detail elsewhere herein, the communication manager 150 may receive first information identifying a set of supported configurations for a set of repeaters, the first information including resource information for the set of supported configurations; receive second information identifying a set of measurements of a network, the set of measurements being associated with use, on the network, of the set of supported configurations; and transmit, to a repeater of the set of repeaters, third information identifying a configuration, of the set of supported configurations, that the repeater is to use for communication in the network, the configuration being based at least in part on the resource information and the set of measurements. Additionally, or alternatively, the communication manager 150 may perform one or more other operations described herein.

In some aspects, the repeater 160 may include a communication manager 162. As described in more detail elsewhere herein, the communication manager 162 may transmit first information identifying a set of supported configurations, the first information including resource information for the set of supported configurations; transmit second information identifying a set of measurements of a network, the set of measurements being associated with use, on the network, of the set of supported configurations; and receive third information identifying a configuration, of the set of supported configurations, to use for communication in the network, the configuration being based at least in part on the resource information and the set of measurements. Additionally, or alternatively, the communication manager 162 may perform one or more other operations described herein.

In some aspects, the UE 120 may include a communication manager 140. As described in more detail elsewhere herein, the communication manager 140 may transmit, to a network node and via a repeater, at least one of: first information identifying a set of supported configurations of the repeater, the first information including resource information for the set of supported configurations, or second information identifying a set of measurements of a network, the set of measurements being associated with use, on the network, of the set of supported configurations; and communicate in the network using a configuration of the set of supported configurations and using the repeater, the configuration being based at least in part on the resource information and the set of measurements. Additionally, or alternatively, the communication manager 140 may perform one or more other operations described herein.

As indicated above, FIG. 1 is provided as an example. Other examples may differ from what is described with regard to FIG. 1.

Figure 2:
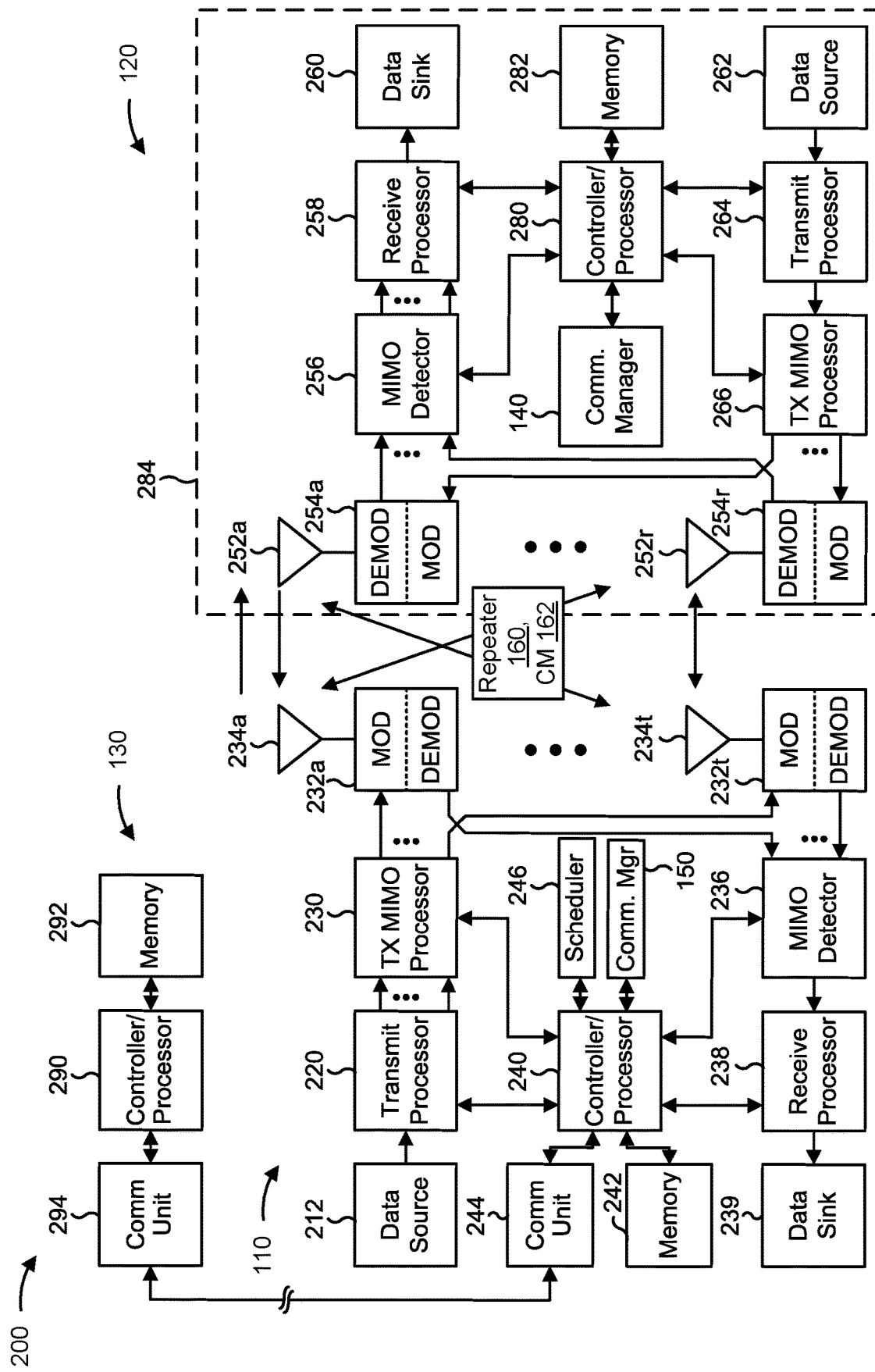
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 (e.g., via a repeater 160, which may include a communication manager 162) and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples.

An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the network node 110, the controller/processor 280 of the UE 120, and/or any other component(s) of FIG. 2 may perform one or more techniques associated with repeater configuration for multi-hop networks, as described in more detail elsewhere herein. For example, the controller/processor 240 of the network node 110, the controller/processor 280 of the UE 120, a controller/processor of a repeater 160, and/or any other component(s) of FIG. 2 may perform or direct operations of, for example, process 600 of FIG. 6, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the network node 110 includes means for receiving first information identifying a set of supported configurations for a set of repeaters, the first information including resource information for the set of supported configurations; means for receiving second information identifying a set of measurements of a network, the set of measurements being associated with use, on the network, of the set of supported configurations; and/or means for transmitting, to a repeater of the set of repeaters, third information identifying a configuration, of the set of supported configurations, that the repeater is to use for communication in the network, the configuration being based at least in part on the resource information and the set of measurements. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the repeater 160 includes means for transmitting first information identifying a set of supported configurations, the first information including resource information for the set of supported configurations; means for transmitting second information identifying a set of measurements of a network, the set of measurements being associated with use, on the network, of the set of supported configurations; and/or means for receiving third information identifying a configuration, of the set of supported configurations, to use for communication in the network, the configuration being based at least in part on the resource information and the set of measurements. In some aspects, the means for the repeater 160 to perform operations described herein may include, for example, a communication manager 162 or one or more components described with regard to the network node 110 or the UE 120, such as transmit processor 220, TX MIMO processor 230, modem 232, antenna 234, MIMO detector 236, receive processor 238, controller/processor 240, memory 242, scheduler 246, antenna 252, modem 254, MIMO detector 256, receive processor 258, transmit processor 264, TX MIMO processor 266, controller/processor 280, or memory 282.

In some aspects, the UE 120 includes means for transmitting, to a network node and via a repeater, at least one of: first information identifying a set of supported configurations of the repeater, the first information including resource information for the set of supported configurations, or second information identifying a set of measurements of a network, the set of measurements being associated with use, on the network, of the set of supported configurations; and/or means for communicating in the network using a configuration of the set of supported configurations and using the repeater, the configuration being based at least in part on the resource information and the set of measurements. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
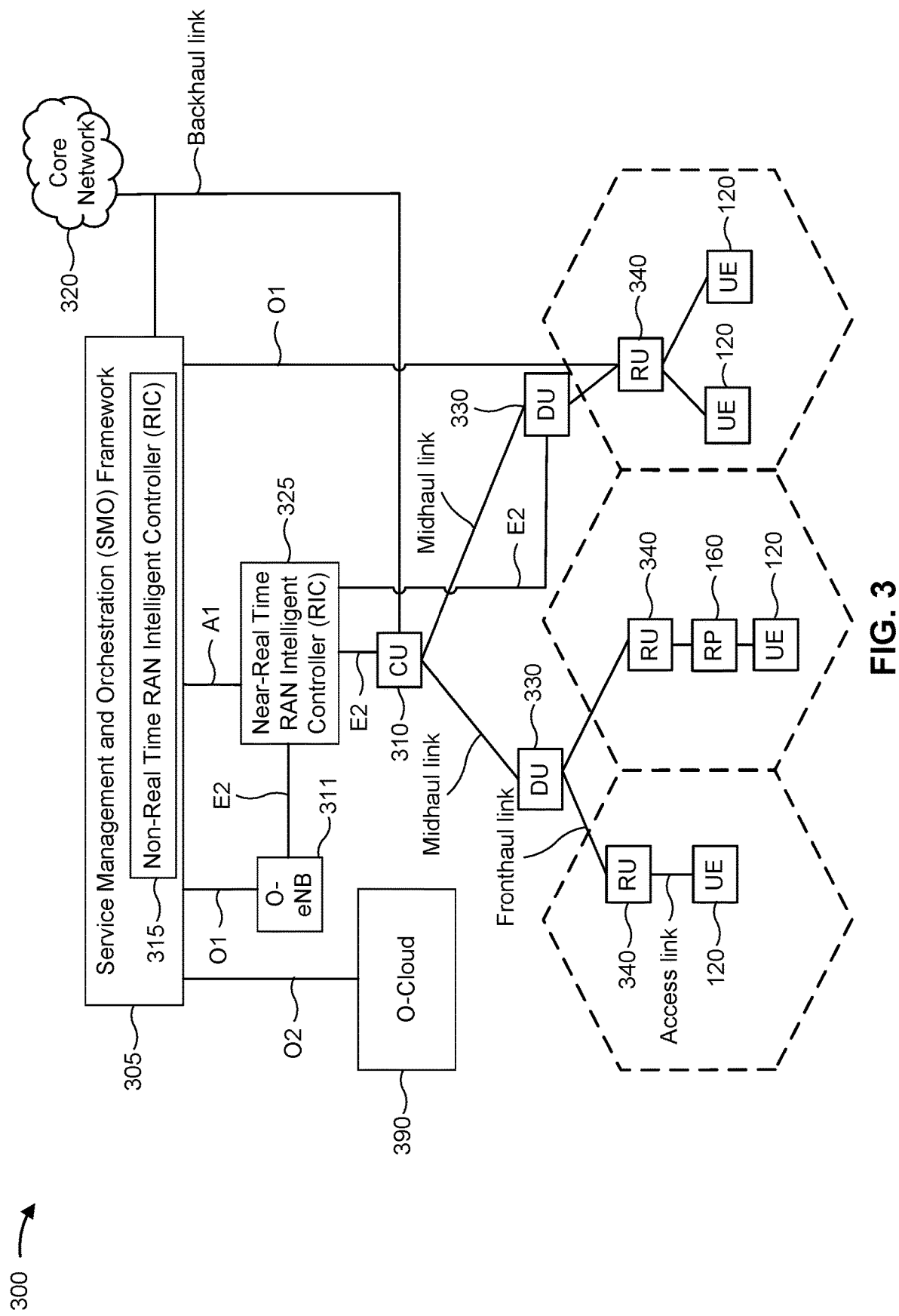
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture. In some implementations, an RU 340 may communicate with a UE 120 via a repeater 160.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
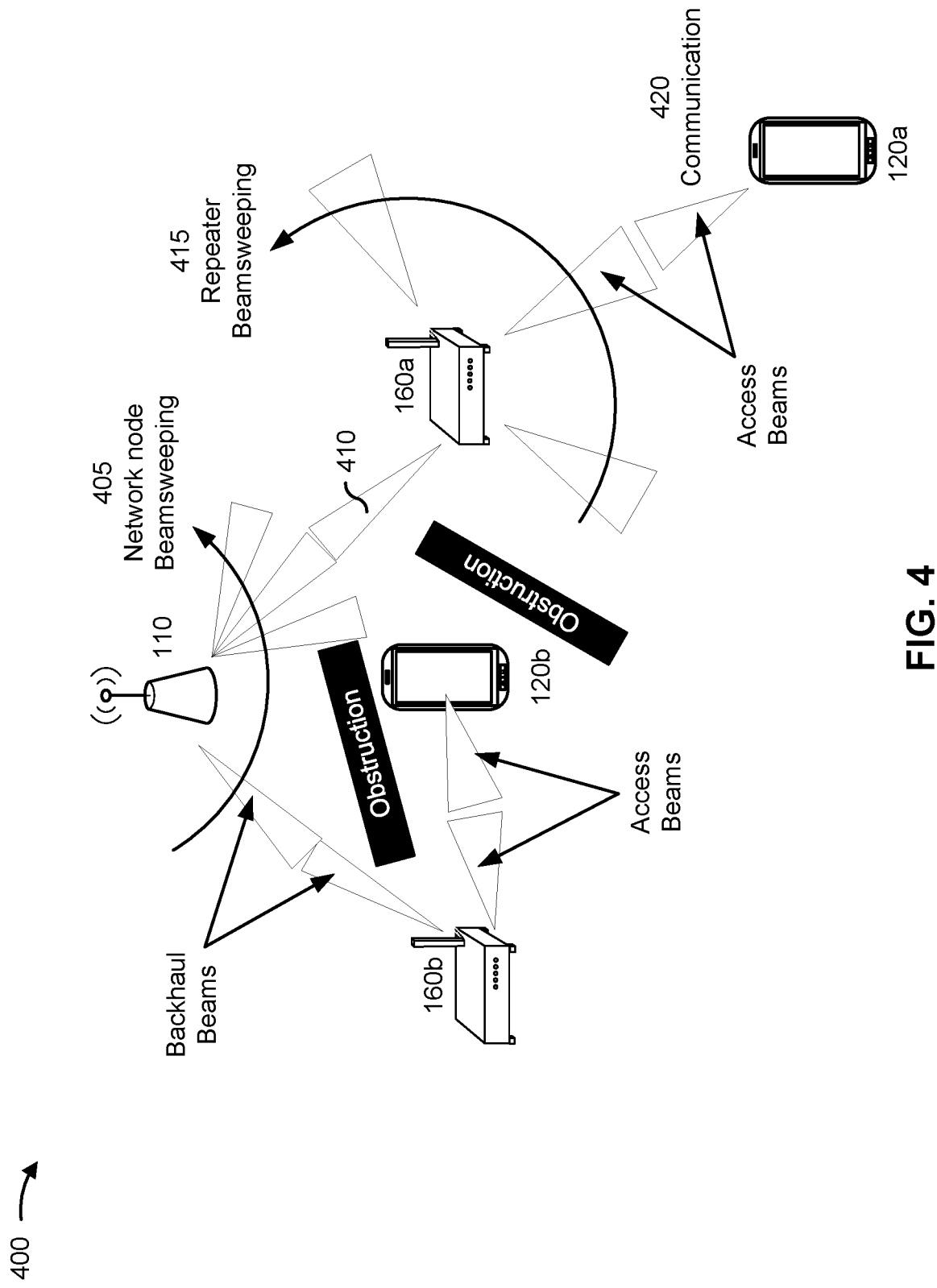
FIG. 4 is a diagram illustrating an example of communicating using a millimeter wave repeater, in accordance with the present disclosure.

FIG. 4 is a diagram illustrating an example 400 of communicating using a millimeter wave repeater, in accordance with the present disclosure.

Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a network node 110 that communicates using the sub-6 GHz radio waves. However, a millimeter wave may not be capable of penetrating the same wall (e.g., depending on a thickness of the wall and/or a material from which the wall is constructed). Some techniques and apparatuses described herein use a millimeter wave repeater 160 (which includes, in the example of FIG. 4, repeater 160a and repeater 160b) to increase the coverage area of a network node 110 and/or to extend coverage to UEs 120 (which include, in the example of FIG. 4, UE 120a and UE 120b) without line of sight to the network node 110 (e.g., due to an obstruction).

For example, as illustrated in the example of FIG. 4, an obstruction between UE 120b and network node 110 blocks or otherwise reduces the quality of a link between the network node 110 and UE 120b. Similarly, an obstruction between UE 120b and repeater 160a blocks or otherwise reduces the quality of a link between the repeater 160a and the UE 120b. However, no obstructions or fewer obstructions exist between repeater 160b and UE 120b, and, as such, it is possible that communications between repeater 160b and UE 120b will have a higher quality than communications between network node 110 and UE 120b or between repeater 160a and UE 120b. Furthermore, the millimeter wave repeater 160 described herein may be a layer 1 or an analog millimeter wave repeater, which is associated with a lower cost, less processing, and lower latency than a layer 2 or layer 3 repeater.

A millimeter wave repeater 160 (sometimes referred to herein as a repeater 160) may perform directional communication by using beamforming to communicate with a network node 110 via a first beam pair (e.g., a backhaul beam pair over a backhaul link with the network node 110) and to communicate with a UE 120 via a second beam pair (e.g., an access beam pair over an access link with the UE 120). For example, in example 400, repeater 160a can communicate with network node 110 via a first beam pair and can communicate with UE 120*a* via a second beam pair. Similarly, repeater 160*b* can communicate with network node 110 via a first beam pair and can communicate with UE 120*a* via a second beam pair. "Beam pair" may refer to a transmit (Tx) beam used by a first device for transmission and a receive (Rx) beam used by a second device for reception of information transmitted by the first device via the Tx beam.

As shown by reference number 405, a network node 110 may use a beamsweeping procedure to transmit communications via multiple beams over time (e.g., using time division multiplexing (TDM)). As shown by reference number 410, the repeater 160*a* may receive a communication via an Rx beam of the repeater 160*a*. As shown by reference number 415, the repeater 160*a* may relay each received communication via multiple Tx beams of the repeater 160*a* (e.g., using TDM). As used herein, "relaying a communication" may refer to transmitting the received communication (e.g., after amplifying the received communication) without decoding the received communication and/or without modifying information carried in the received communication. Alternatively, "relaying a received communication" may refer to transmitting the received communication after decoding the received communication and/or modifying information carried in the received communication. In some aspects, a received communication may be relayed using a different time resource, a different frequency resource, and/or a different spatial resource (e.g., a different beam) to transmit the communication as compared to a time resource, a frequency resource, and/or a spatial resource in which the communication was received. As shown by reference number 420, a UE 120*a* may receive a relayed communication. In some aspects, the UE 120*a* may generate a communication to be transmitted to the network node 110. The UE 120*a* may then transmit the communication to the repeater 160*a* for relaying to the network node 110.

As indicated above, FIG. 4 is provided as an example. Other examples may differ from what is described with regard to FIG. 4.

As described above, a network node may communicate with a UE using a repeater (e.g., an analog repeater or mmWave repeater). Deployment of repeaters can enable increased network densification, which ensures more reliable coverage for UEs. This is especially important for higher-band communications, such as mmWave, which may be more subject to signal blockage or attenuation as a result of obstructions between a network node and a UE. However, deploying many repeaters in an area may result in increased energy consumption to support the network.

Some aspects described herein enable repeater configuration for multi-hop networks to ensure efficient energy usage. For example, a network node may receive information identifying a set of possible configurations of a repeater and a set of measurements of a network or of energy consumption of the repeater when using configurations of the set of possible configurations. In this case, the network node may select a configuration, from the set of possible configurations, based at least in part on the set of measurements of the network or of the energy consumption of the repeater. Additionally, or alternatively, the network node may be configured to optimize between, for example, network coverage and energy consumption to ensure that deployment of repeaters does not result in an excessive usage of energy resources among other resources. In this way, the network node, the repeater, and one or more UEs enable dynamic configuration of repeaters to ensure efficient network densification without excessive usage of energy resources.

Figure 5:
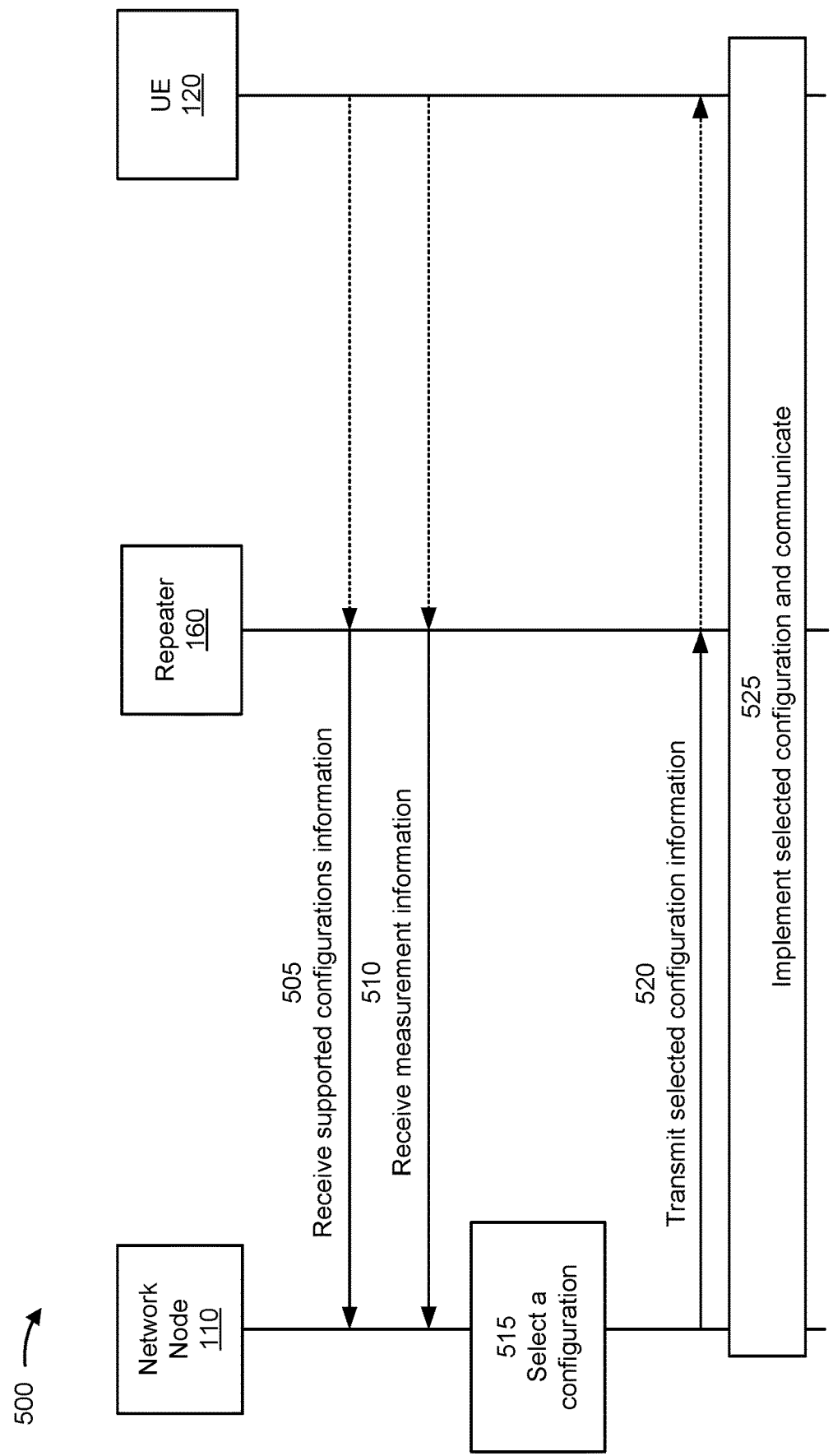
FIG. 5 is a diagram of an example associated with repeater configuration for multi-hop networks, in accordance with the present disclosure.

FIG. 5 is a diagram of an example 500 associated with repeater configuration for multi-hop networks, in accordance with the present disclosure. As shown in FIG. 5, a network node 110 may communicate with a UE 120 via a repeater 160.

As shown by reference number 505, the network node 110 may receive supported configurations information. For example, the network node 110 may receive first information identifying a set of supported configurations for the repeater 160 and/or one or more other repeaters 160. Additionally, or alternatively, the network node 110 may receive first information identifying a set of supported configurations for the UE 120 and/or one or more other UEs 120 using the repeater 160 and/or one or more other repeaters 160 for communication with the network node 110.

In some aspects, the network node 110 may receive information indicating different types of supported configurations. For example, the network node 110 may receive information indicating a set of receive (RX) or transmit (TX) beamforming configurations, which may include information identifying different beams, groups of beams, or codebooks that are supported by the repeater 160. Additionally, or alternatively, the network node 110 may receive information identifying a set of supported antenna configurations of the repeater 160, such as information identifying candidate sets of active antenna elements, ports, or subarrays that can be used for transmission or reception; information identifying a maximum quantity of antenna elements, ports, or subarrays that the repeater 160 can use for transmission or reception; or information identifying a step size for changing a quantity of active antenna elements, ports, or subarrays; among other examples.

In some implementations, the network node 110 may receive information indicating whether the repeater 160 supports a multi-beam configuration, in which the repeater 160 is configured to receive and/or transmit using a plurality of beams, concurrently. Additionally, or alternatively, the network node 110 may receive information indicating whether the repeater 160 supports multi-band operation. For example, the network node 110 may receive information indicating whether the repeater 160 supports forwarding of signals in a plurality of passbands, concurrently. Additionally, or alternatively, the network node 110 may receive information indicating whether multi-band operation is configured for support of multi-band operation on adjacent bands, in which case the repeater 160 may indicate support (or lack thereof) for using common components (e.g., filters, antenna arrays, power amplifiers, transmit chains, or receive chains) for the adjacent bands.

In some implementations, the network node 110 may receive information indicating a set of supported power configurations. For example, the network node 110 may receive information indicating a set of possible transmit power levels or amplification gain levels. Additionally, or alternatively, the network node 110 may receive information associated with other signal processing capabilities, such as a digital processing capability, a digital post distortion processing capability, a peak-to-average power ratio (PAPR) reduction capability, a noise reduction capability, a buffering capability, a resource element remapping capability, a channel estimation capability, an equalization capability, a decoding capability, a log-likelihood ratio (LLR) computation capability, or a measurement capability, among other examples.

As shown by reference number 510, the network node 110 may receive measurement information. For example, the network node 110 may receive second information identifying a set of measurements of a network. In this case, the set of measurements may be associated with use, on the network, of a set of supported configurations identified in the first information. For example, the repeater 160 may transmit information indicating a power consumption when using the set of supported configurations. Additionally, or alternatively, the UE 120 may transmit information indicating a signal strength, signal to interference plus noise ratio (SINR), or a reference signal received power (RSRP), among other examples, measured when the repeater 160 is using the set of supported configurations.

In some implementations, the measurement information may include resource information. For example, the network node 110 may receive information identifying a consumption of power resources when using a particular supported configuration. Additionally, or alternatively, the network node 110 may receive information identifying a consumption of network resources when using a particular supported configuration. Additionally, or alternatively, the network node 110 may receive information identifying a usage of service resources. For example, when the network node 110 is operated by a first entity and the repeater 160 is operated by a second entity, the first entity may contract with the second entity for a particular usage of service resources (e.g., a particular amount of data, a particular amount of time, a particular amount of money). In this case, the network node 110 may receive information identifying a usage of the contracted service (e.g., how much data is conveyed, how much time is used conveying data, or how much money is billed for the conveyance of the data) in connection with a particular supported configuration. In some implementations, the network node 110 may receive a particular type of indicator of the resource information. For example, the network node 110 may receive a relative indicator (e.g., an indicator relative to a reference value or an absolute value), a range indicator (e.g., an indicator of a value within a range), a qualitative indicator (e.g., a customer satisfaction score when using a particular supported configuration), or a time-specific indicator (e.g., a set of indicators identifying a resource usage or availability change over time), among other examples. Additionally, or alternatively, resource information may be specified with respect to a particular time, frequency, or spatial resource. Additionally, or alternatively, resource information may indicate a value for resources, such as a negotiated value or a specified value.

As shown by reference number 515, the network node 110 may select a configuration. For example, the network node 110 may select a configuration from the set of possible configurations based on the measurement information. In some implementations, the network node 110 may be a control entity that selects a configuration for a group of repeaters 160 and/or UEs 120. For example, the network node 110 may optimize one or more parameters or settings for groups of repeaters 160 and/or UEs 120 based at least in part on reported possible configurations and reported measurements.

In another example, rather than residing in the network node 110, a service for optimizing the one or more parameters (and selecting a configuration related thereto) may reside in a standalone control node (e.g., a network node 110 controlling many CUs, DUs, and/or RUs) or a cloud service (e.g., a network node 110 in a core network). Additionally, or alternatively, the service may reside in the UE 120 and/or the repeater 160. In this case, rather than the network node 110 performing the selection, the UE 120 and/or the repeater 160 may perform one or more steps described with regard to the network node 110. Accordingly, functionality described in terms of the network node 110 may in some implementations, reside in one or more other devices, such as another network node, a UE, a repeater, a standalone control node, a cloud service, or another device.

In some implementations, the network node 110 may select a configuration based at least in part on information requesting selection of a configuration. For example, the repeater 160 may transmit information identifying a preferred configuration (e.g., of the set of possible configurations) based at least in part on one or more local measurements or other information available to the repeater 160. In this case, the network node 110 may determine whether to confirm the request of the repeater 160 based at least in part on information reported by the repeater 160 (e.g., the local measurements or other information) or information obtained from one or more other sources (e.g., the UE 120, other repeaters 160, other UEs 120, or other network nodes, among other examples).

In some implementations, the network node 110 may perform an optimization procedure to select the configuration. For example, the network node 110 may optimize a set of parameters of a configuration based on the resource information (e.g., to optimize for one or more factors, such as bandwidth, reliability, cost, or resource availability, among other examples). In this case, the network node 110 may use the resource information and/or the set of possible configurations as inputs to a machine learning or artificial intelligence model that can select an optimized set of parameters (e.g., a possible configuration) that the repeater 160 is to implement to optimize performance toward a particular target (e.g., bandwidth, reliability, cost, or resource availability, among other examples).

As shown by reference numbers 520 and 525, the network node 110 may transmit selected configuration information and the network node, repeater 160, and the UE 120 may implement a selected configuration and communicate using the selected configuration. For example, the network node 110 may transmit information identifying the selected configuration to the repeater 160 and/or to the UE 120 (e.g., via the repeater 160). In this case, the repeater 160 and/or the UE 120 may implement the selected configuration by adjusting one or more parameters, such as a power usage parameter, a modulation and coding scheme, a transmission configuration indicator state, a bandwidth, a data rate, or another parameter.

In some implementations, the network node 110 may transmit a particular type of indicator to identify the selected configuration. For example, the network node 110 may transmit a beam index, a transmission configuration indicator state, or a reference signal index, among other examples to identify the selected configuration. Additionally, or alternatively, the network node 110 may transmit information identifying an index value, which the repeater 160 and/or the UE 120 may interpret to determine the selected configuration. For example, when the repeater 160 reports a set of N possible configurations with a set of index values (0 to N–1), the network node 110 may transmit a response message with an index value, of the set of index values, corresponding to a configuration of the set of possible configurations. In some implementations, the repeater 160 and/or the UE 120 may switch to using the selected configuration at a particular time. For example, the repeater 160 may report a latency associated with switching between any configuration (or between specific pairs of configurations). In this case, the network node 110, the UE 120, and/or the repeater 160 may commence using a new configuration after expiration of a period of time corresponding to the latency. Additionally, or alternatively, the network node 110, the UE 120, and/or the repeater 160 may be configured with a default period of time for a gap between signaling a selected configuration and implementing the selected configuration to account, for example, for a switching latency or a signaling delay.

In some implementations, the network node 110 may transmit information to enable the repeater 160 and/or the UE 120 to autonomously or semi-autonomously derive the selected configuration. For example, the network node 110 may transmit information identifying a rule for autonomously changing selected configurations (e.g., a threshold measurement value at which time the repeater 160 can change between a set of selected configurations). Additionally, or alternatively, the network node 110 may transmit information identifying inputs, factors, or weights for an artificial intelligence or machine learning model that the repeater 160 can use to autonomously change configurations. In this case, based on the network node 110 configuring the threshold or factors that the repeater 160 uses to autonomously change configurations, the configurations can be changed deterministically, thereby enabling the network node 110 to remain synchronized with the repeater 160.

Based at least in part on the network node 110, the UE 120, and the repeater 160 communicating information to enable optimization of a configuration of the repeater 160, the network node 110, the UE 120, and the repeater 160 may conserve computing, power, network, and/or communication resources that may have otherwise been consumed to enable communication in a network. For example, based at least in part on the network node 110, the UE 120, and the repeater 160 communicating information to enable optimization of a configuration of the repeater 160, the network node 110, the UE 120, and the repeater 160 may communicate using less power consumption and a reduced error rate, which may conserve computing, power, network, and/or communication resources that may have otherwise been consumed to detect and/or correct communication errors.

As indicated above, FIG. 5 is provided as an example. Other examples may differ from what is described with respect to FIG. 5.

Figure 6:
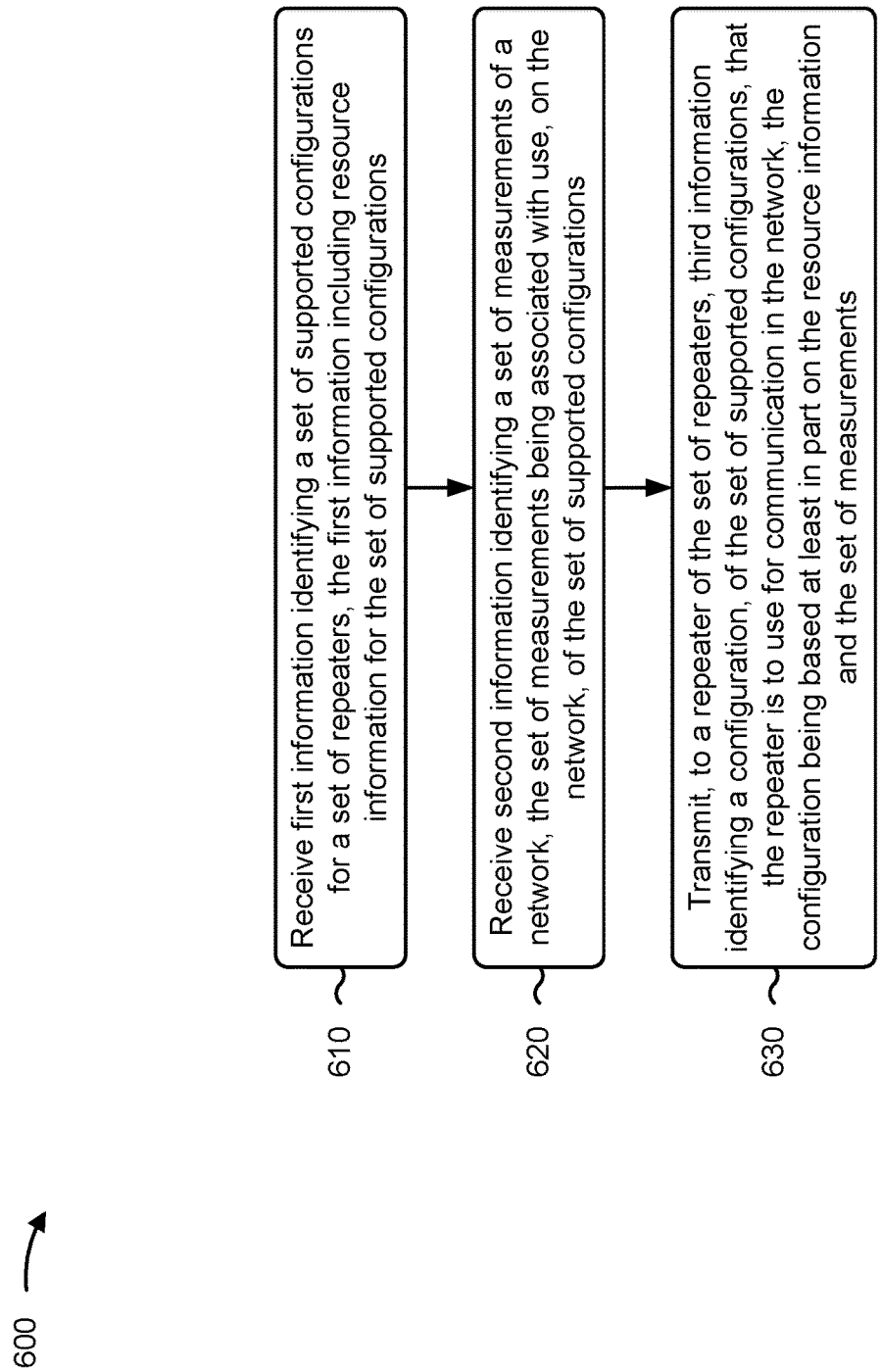
FIG. 6 is a diagram illustrating an example process performed, for example, by a network node, in accordance with the present disclosure.

FIG. 6 is a diagram illustrating an example process 600 performed, for example, by a network node, in accordance with the present disclosure. Example process 600 is an example where the network node (e.g., network node 110) performs operations associated with repeater configuration for multi-hop networks.

As shown in FIG. 6, in some aspects, process 600 may include receiving first information identifying a set of supported configurations for a set of repeaters, the first information including resource information for the set of supported configurations (block 610). For example, the network node (e.g., using reception component 902 and/or communication manager 906, depicted in FIG. 9) may receive first information identifying a set of supported configurations for a set of repeaters, the first information including resource information for the set of supported configurations, as described above. As described in FIG. 5, the first information may indicate a configuration that is supported by a receiver and resources that are used for the configuration, such as energy resources, processing resources, spectrum resources, or financial resources.

As further shown in FIG. 6, in some aspects, process 600 may include receiving second information identifying a set of measurements of a network, the set of measurements being associated with use, on the network, of the set of supported configurations (block 620). For example, the network node (e.g., using reception component 902 and/or communication manager 906, depicted in FIG. 9) may receive second information identifying a set of measurements of a network, the set of measurements being associated with use, on the network, of the set of supported configurations, as described above. In this case, the set of measurements may include measurements of energy usage, measurements of communication quality (e.g., RSRP, block error rate, or data rate, among other examples).

As further shown in FIG. 6, in some aspects, process 600 may include transmitting, to a repeater of the set of repeaters, third information identifying a configuration, of the set of supported configurations, that the repeater is to use for communication in the network, the configuration being based at least in part on the resource information and the set of measurements (block 630). For example, the network node (e.g., using transmission component 904 and/or communication manager 906, depicted in FIG. 9) may transmit, to a repeater of the set of repeaters, third information identifying a configuration, of the set of supported configurations, that the repeater is to use for communication in the network, the configuration being based at least in part on the resource information and the set of measurements, as described above. The third information may include information indicating that the repeater is to use a particular configuration for forwarding communications between the UE and the network node. In some aspects, the repeater may optimize a selection of the configuration for the repeater and one or more other configurations for one or more other repeaters to, for example, minimize energy resource usage.

Process 600 may include additional aspects, such as any single aspect or any combination of aspects described below and/or in connection with one or more other processes described elsewhere herein.

In a first aspect, the first information includes information identifying at least one of a receive beamforming configuration, a transmit beamforming configuration, a multi-beam configuration, an antenna configuration, a multi-band operation configuration, a power state configuration, or a processing configuration.

In a second aspect, alone or in combination with the first aspect, the resource information includes at least one of power consumption information or provider information.

In a third aspect, alone or in combination with one or more of the first and second aspects, the resource information includes one or more parameters having at least one of a relative value, an absolute value, a value within a range, or an indication of a change to a value over a period of time.

In a fourth aspect, alone or in combination with one or more of the first through third aspects, the resource information is associated with at least one of a set of time resources, a set of frequency resources, or a set of spatial resources.

In a fifth aspect, alone or in combination with one or more of the first through fourth aspects, the resource information is associated with a contractual agreement.

In a sixth aspect, alone or in combination with one or more of the first through fifth aspects, the set of supported configurations is associated with a set of index values, and transmitting the third information identifying the configuration comprises transmitting a parameter identifying an index value of the set of index values.

In a seventh aspect, alone or in combination with one or more of the first through sixth aspects, process 600 includes communicating using the repeater and the configuration based at least in part on transmitting the third information identifying the configuration to the repeater.

In an eighth aspect, alone or in combination with one or more of the first through seventh aspects, communicating comprises communicating at a time based at least in part on an identified switching latency between a previous configuration and the configuration.

In a ninth aspect, alone or in combination with one or more of the first through eighth aspects, process 600 includes transmitting fourth information identifying the configuration to a UE, and communicating with the UE, via the repeater, using the configuration.

In a tenth aspect, alone or in combination with one or more of the first through ninth aspects, process 600 includes performing an optimization procedure across the set of repeaters, and selecting the configuration for the repeater based at least in part on a result of performing the optimization procedure and the set of supported configurations.

In an eleventh aspect, alone or in combination with one or more of the first through tenth aspects, the network node is a control entity residing at one of a network-side device, a UE, a particular repeater of the set of repeaters, a standalone control node, or a cloud service node.

In a twelfth aspect, alone or in combination with one or more of the first through eleventh aspects, the first information includes a suggestion of one or more configurations of the set of supported configurations, and process 600 includes selecting the configuration based at least in part on the suggestion of the one or more configurations.

In a thirteenth aspect, alone or in combination with one or more of the first through twelfth aspects, process 600 includes providing fourth information associated with switching configurations, wherein the fourth information is associated with one or more switching rules to enable autonomous switching of configurations without explicit signaling.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
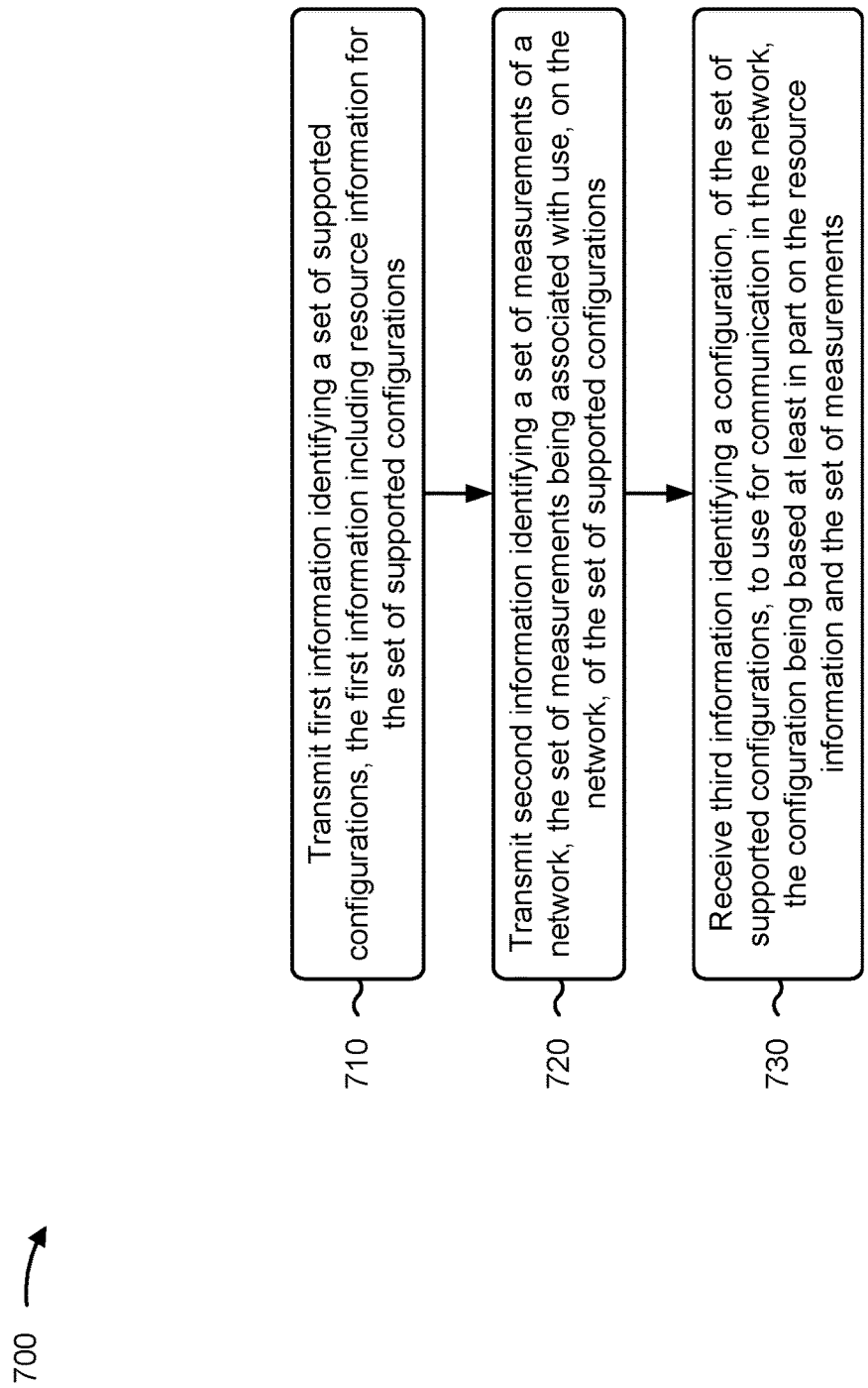
FIG. 7 is a diagram illustrating an example process performed, for example, by a repeater, in accordance with the present disclosure.

FIG. 7 is a diagram illustrating an example process 700 performed, for example, by a repeater, in accordance with the present disclosure. Example process 700 is an example where the repeater (e.g., repeater 160) performs operations associated with repeater configuration for multi-hop networks.

As shown in FIG. 7, in some aspects, process 700 may include transmitting first information identifying a set of supported configurations, the first information including resource information for the set of supported configurations (block 710). For example, the repeater (e.g., using transmission component 1004 and/or communication manager 162, depicted in FIG. 10) may transmit first information identifying a set of supported configurations, the first information including resource information for the set of supported configurations, as described above.

As further shown in FIG. 7, in some aspects, process 700 may include transmitting second information identifying a set of measurements of a network, the set of measurements being associated with use, on the network, of the set of supported configurations (block 720). For example, the repeater (e.g., using transmission component 1004 and/or communication manager 162, depicted in FIG. 10) may transmit second information identifying a set of measurements of a network, the set of measurements being associated with use, on the network, of the set of supported configurations, as described above.

As further shown in FIG. 7, in some aspects, process 700 may include receiving third information identifying a configuration, of the set of supported configurations, to use for communication in the network, the configuration being based at least in part on the resource information and the set of measurements (block 730). For example, the repeater (e.g., using reception component 1002 and/or communication manager 162, depicted in FIG. 10) may receive third information identifying a configuration, of the set of supported configurations, to use for communication in the network, the configuration being based at least in part on the resource information and the set of measurements, as described above.

Process 700 may include additional aspects, such as any single aspect or any combination of aspects described below and/or in connection with one or more other processes described elsewhere herein.

In a first aspect, the first information includes information identifying at least one of a receive beamforming configuration, a transmit beamforming configuration, a multi-beam configuration, an antenna configuration, a multi-band operation configuration, a power state configuration, or a processing configuration.

In a second aspect, alone or in combination with the first aspect, the resource information includes at least one of power consumption information or provider information.

In a third aspect, alone or in combination with one or more of the first and second aspects, the resource information includes one or more parameters having at least one of a relative value, an absolute value, a value within a range, or an indication of a change to a value over a period of time.

In a fourth aspect, alone or in combination with one or more of the first through third aspects, the resource information is associated with at least one of a set of time resources, a set of frequency resources, or a set of spatial resources.

In a fifth aspect, alone or in combination with one or more of the first through fourth aspects, the resource information is associated with a contractual agreement.

In a sixth aspect, alone or in combination with one or more of the first through fifth aspects, the set of supported configurations is associated with a set of index values, and receiving the third information identifying the configuration comprises receiving a parameter identifying an index value of the set of index values.

In a seventh aspect, alone or in combination with one or more of the first through sixth aspects, process 700 includes forwarding, between a network node and a UE, one or more communications using the configuration based at least in part on transmitting the third information identifying the configuration to the repeater.

In an eighth aspect, alone or in combination with one or more of the first through seventh aspects, forwarding the one or more communications comprises forwarding the one or more communications at a time based at least in part on an identified switching latency between a previous configuration and the configuration.

In a ninth aspect, alone or in combination with one or more of the first through eighth aspects, process 700 includes transmitting fourth information identifying the configuration to a UE.

In a tenth aspect, alone or in combination with one or more of the first through ninth aspects, the first information includes a suggestion of the configuration.

In an eleventh aspect, alone or in combination with one or more of the first through tenth aspects, process 700 includes receiving fourth information associated with switching configurations, wherein the fourth information is associated with one or more switching rules to enable autonomous switching of configurations without explicit signaling, and switching configurations based at least in part on the one or more switching rules.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
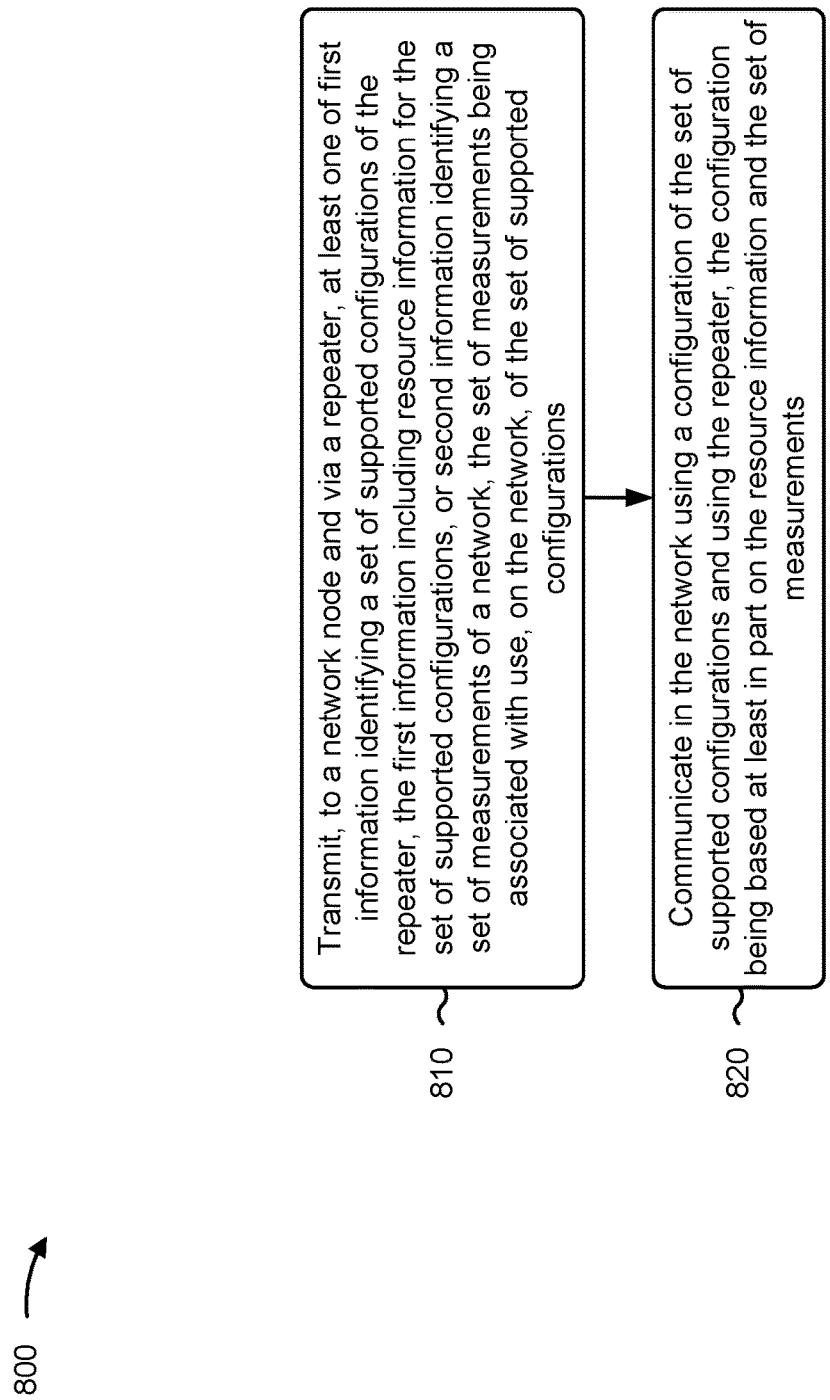
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with repeater configuration for multi-hop networks.

As shown in FIG. 8, in some aspects, process 800 may include transmitting, to a network node and via a repeater, at least one of: first information identifying a set of supported configurations of the repeater, the first information including resource information for the set of supported configurations, or second information identifying a set of measurements of a network, the set of measurements being associated with use, on the network, of the set of supported configurations (block 810). For example, the UE (e.g., using transmission component 1104 and/or communication manager 1106, depicted in FIG. 11) may transmit, to a network node and via a repeater, at least one of: first information identifying a set of supported configurations of the repeater, the first information including resource information for the set of supported configurations, or second information identifying a set of measurements of a network, the set of measurements being associated with use, on the network, of the set of supported configurations, as described above.

As further shown in FIG. 8, in some aspects, process 800 may include communicating in the network using a configuration of the set of supported configurations and using the repeater, the configuration being based at least in part on the resource information and the set of measurements (block 820). For example, the UE (e.g., using reception component 1102, transmission component 1104, and/or communication manager 1106, depicted in FIG. 11) may communicate in the network using a configuration of the set of supported configurations and using the repeater, the configuration being based at least in part on the resource information and the set of measurements, as described above.

Process 800 may include additional aspects, such as any single aspect or any combination of aspects described below and/or in connection with one or more other processes described elsewhere herein.

In a first aspect, the first information includes information identifying at least one of a receive beamforming configuration, a transmit beamforming configuration, a multi-beam configuration, an antenna configuration, a multi-band operation configuration, a power state configuration, or a processing configuration.

In a second aspect, alone or in combination with the first aspect, the resource information includes at least one of power consumption information or provider information.

In a third aspect, alone or in combination with one or more of the first and second aspects, the resource information includes one or more parameters having at least one of a relative value, an absolute value, a value within a range, or an indication of a change to a value over a period of time.

In a fourth aspect, alone or in combination with one or more of the first through third aspects, the resource information is associated with at least one of a set of time resources, a set of frequency resources, or a set of spatial resources.

In a fifth aspect, alone or in combination with one or more of the first through fourth aspects, the resource information is associated with a contractual agreement.

In a sixth aspect, alone or in combination with one or more of the first through fifth aspects, the set of supported configurations is associated with a set of index values, and process 800 includes receiving a parameter identifying an index value of the set of index values.

In a seventh aspect, alone or in combination with one or more of the first through sixth aspects, the first information includes a suggestion of the configuration.

In an eighth aspect, alone or in combination with one or more of the first through seventh aspects, process 800 includes receiving fourth information associated with switching configurations, wherein the fourth information is associated with one or more switching rules to enable autonomous switching of configurations without explicit signaling, and switching configurations based at least in part on the one or more switching rules.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
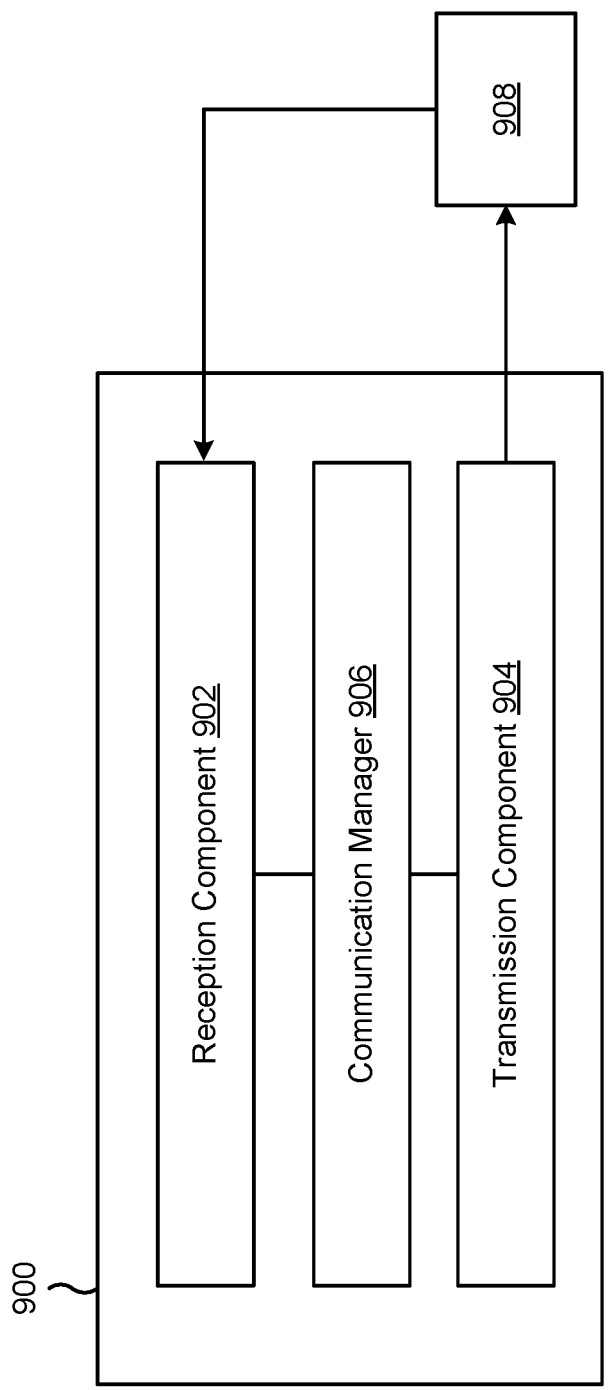
FIGS. 9-11 are diagrams of example apparatuses for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIG. 5. Additionally, or alternatively, the apparatus 900 may be configured to perform one or more processes described herein, such as process 600 of FIG. 6. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The reception component 902 may receive first information identifying a set of supported configurations for a set of repeaters, the first information including resource information for the set of supported configurations. The reception component 902 may receive second information identifying a set of measurements of a network, the set of measurements being associated with use, on the network, of the set of supported configurations. The transmission component 904 may transmit, to a repeater of the set of repeaters, third information identifying a configuration, of the set of supported configurations, that the repeater is to use for communication in the network, the configuration being based at least in part on the resource information and the set of measurements.

The communication manager 906 may communicate using the repeater and the configuration based at least in part on transmitting the third information identifying the configuration to the repeater. The transmission component 904 may transmit fourth information identifying the configuration to a UE. The communication manager 906 may communicate with the UE, via the repeater, using the configuration. The communication manager 906 may perform an optimization procedure across the set of repeaters. The communication manager 906 may select the configuration for the repeater based at least in part on a result of performing the optimization procedure. The communication manager 906 may provide fourth information associated with switching configurations, wherein the fourth information is associated with one or more switching rules to enable autonomous switching of configurations without explicit signaling.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
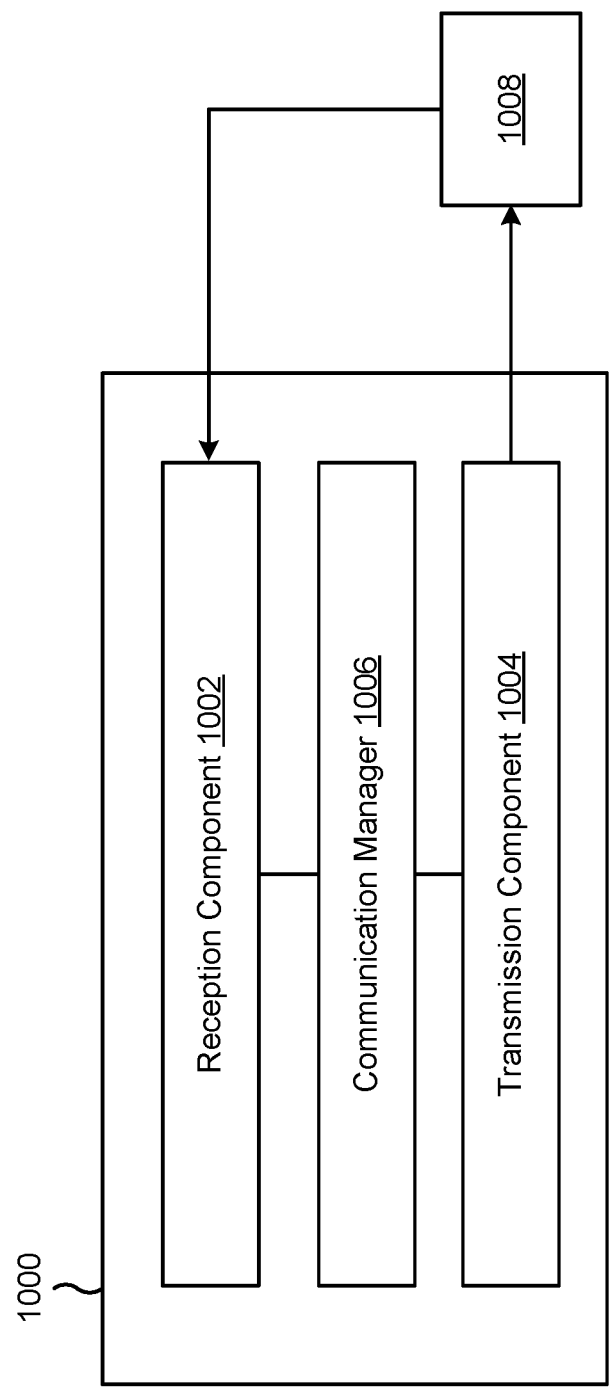

FIG. 10 is a diagram of an example apparatus 1000 for wireless communication, in accordance with the present disclosure. The apparatus 1000 may be a repeater, or a repeater may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 162 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIG. 5. Additionally, or alternatively, the apparatus 1000 may be configured to perform one or more processes described herein, such as process 700 of FIG. 7. In some aspects, the apparatus 1000 and/or one or more components shown in FIG. 10 may include one or more components of the repeater described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the repeater described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the repeater described in connection with FIG. 2. In some aspects, the transmission component 1004 may be co-located with the reception component 1002 in a transceiver.

The transmission component 1004 may transmit first information identifying a set of supported configurations, the first information including resource information for the set of supported configurations. The transmission component 1004 may transmit second information identifying a set of measurements of a network, the set of measurements being associated with use, on the network, of the set of supported configurations. The reception component 1002 may receive third information identifying a configuration, of the set of supported configurations, to use for communication in the network, the configuration being based at least in part on the resource information and the set of measurements.

The communication manager 1006 may forward, between a network node and a UE, one or more communications using the configuration based at least in part on transmitting the third information identifying the configuration to the repeater. The transmission component 1004 may transmit fourth information identifying the configuration to a UE. The reception component 1002 may receive fourth information associated with switching configurations, wherein the fourth information is associated with one or more switching rules to enable autonomous switching of configurations without explicit signaling. The communication manager 1006 may switch configurations based at least in part on the one or more switching rules.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
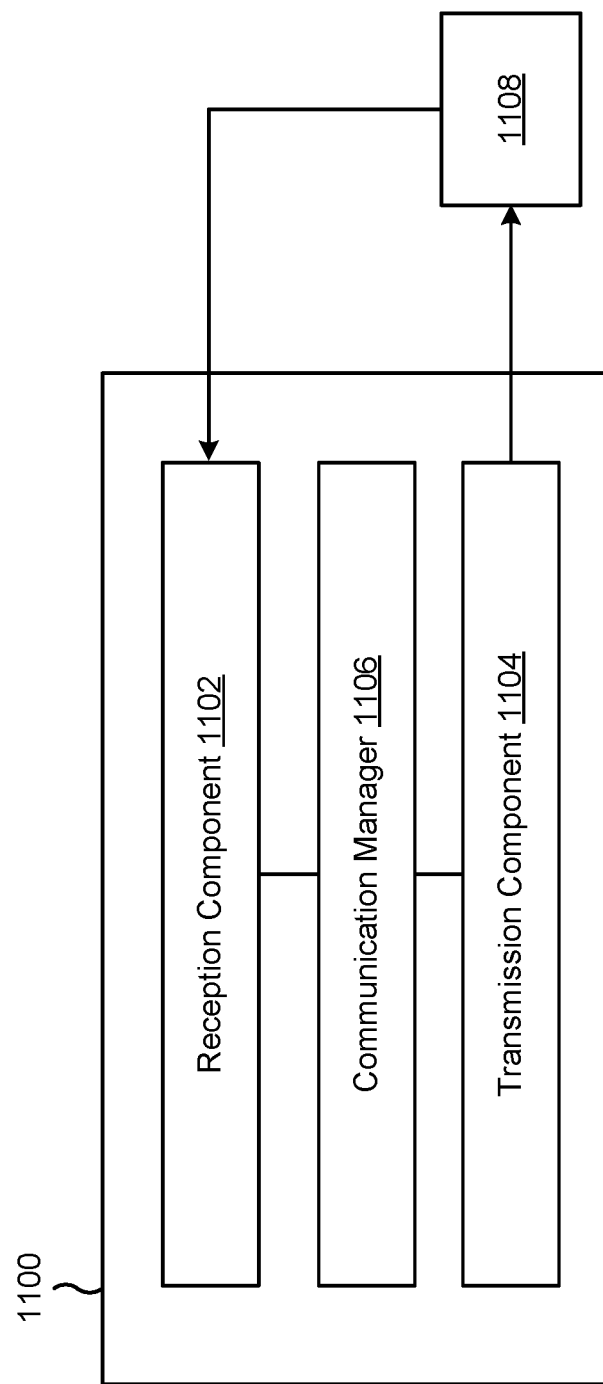

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIG. 5. Additionally, or alternatively, the apparatus 1100 may be configured to perform one or more processes described herein, such as process 800 of FIG. 8. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The transmission component 1104 may transmit, to a network node and via a repeater, at least one of first information identifying a set of supported configurations of the repeater, the first information including resource information for the set of supported configurations, or second information identifying a set of measurements of a network, the set of measurements being associated with use, on the network, of the set of supported configurations. The reception component 1102 and/or the transmission component 1104 may communicate in the network using a configuration of the set of supported configurations and using the repeater, the configuration being based at least in part on the resource information and the set of measurements.

The reception component 1102 may receive fourth information associated with switching configurations, wherein the fourth information is associated with one or more switching rules to enable autonomous switching of configurations without explicit signaling. The communication manager 1106 may switch configurations based at least in part on the one or more switching rules.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a network node, comprising: receiving first information identifying a set of supported configurations for a set of repeaters, the first information including resource information for the set of supported configurations; receiving second information identifying a set of measurements of a network, the set of measurements being associated with use, on the network, of the set of supported configurations; and transmitting, to a repeater of the set of repeaters, third information identifying a configuration, of the set of supported configurations, that the repeater is to use for communication in the network, the configuration being based at least in part on the resource information and the set of measurements.

Aspect 2: The method of Aspect 1, wherein the first information includes information identifying at least one of: a receive beamforming configuration, a transmit beamforming configuration, a multi-beam configuration, an antenna configuration, a multi-band operation configuration, a power state configuration, or a processing configuration.

Aspect 3: The method of any of Aspects 1-2, wherein the resource information includes at least one of power consumption information or provider information.

Aspect 4: The method of any of Aspects 1-3, wherein the resource information includes one or more parameters having at least one of: a relative value, an absolute value, a value within a range, or an indication of a change to a value over a period of time.

Aspect 5: The method of any of Aspects 1-4, wherein the resource information is associated with at least one of: a set of time resources, a set of frequency resources, or a set of spatial resources.

Aspect 6: The method of any of Aspects 1-5, wherein the resource information is associated with a contractual agreement.

Aspect 7: The method of any of Aspects 1-6, wherein the set of supported configurations is associated with a set of index values; and wherein transmitting the third information identifying the configuration comprises: transmitting a parameter identifying an index value of the set of index values.

Aspect 8: The method of any of Aspects 1-7, further comprising: communicating using the repeater and the configuration based at least in part on transmitting the third information identifying the configuration to the repeater.

Aspect 9: The method of Aspect 8, wherein communicating comprises: communicating at a time based at least in part on an identified switching latency between a previous configuration and the configuration.

Aspect 10: The method of any of Aspects 1-9, further comprising: transmitting fourth information identifying the configuration to a user equipment (UE); and communicating with the UE, via the repeater, using the configuration.

Aspect 11: The method of any of Aspects 1-10, further comprising: performing an optimization procedure across the set of repeaters; and selecting the configuration for the repeater based at least in part on a result of performing the optimization procedure and the set of supported configurations.

Aspect 12: The method of any of Aspects 1-11, wherein the network node is a control entity residing at one of: a network-side device, a user equipment (UE), a particular repeater of the set of repeaters, a standalone control node, or a cloud service node.

Aspect 13: The method of any of Aspects 1-12, wherein the first information includes a suggestion of one or more configurations of the set of supported configurations; and further comprising: selecting the configuration based at least in part on the suggestion of the one or more configurations.

Aspect 14: The method of any of Aspects 1-13, further comprising: providing fourth information associated with switching configurations, wherein the fourth information is associated with one or more switching rules to enable autonomous switching of configurations without explicit signaling.

Aspect 15: A method of wireless communication performed by a repeater, comprising: transmitting first information identifying a set of supported configurations, the first information including resource information for the set of supported configurations; transmitting second information identifying a set of measurements of a network, the set of measurements being associated with use, on the network, of the set of supported configurations; and receiving third information identifying a configuration, of the set of supported configurations, to use for communication in the network, the configuration being based at least in part on the resource information and the set of measurements.

Aspect 16: The method of Aspect 15, wherein the first information includes information identifying at least one of: a receive beamforming configuration, a transmit beamforming configuration, a multi-beam configuration, an antenna configuration, a multi-band operation configuration, a power state configuration, or a processing configuration.

Aspect 17: The method of any of Aspects 15-16, wherein the resource information includes at least one of power consumption information or provider information.

Aspect 18: The method of any of Aspects 15-17, wherein the resource information includes one or more parameters having at least one of: a relative value, an absolute value, a value within a range, or an indication of a change to a value over a period of time.

Aspect 19: The method of any of Aspects 15-18, wherein the resource information is associated with at least one of: a set of time resources, a set of frequency resources, or a set of spatial resources.

Aspect 20: The method of any of Aspects 15-19, wherein the resource information is associated with a contractual agreement.

Aspect 21: The method of any of Aspects 15-20, wherein the set of supported configurations is associated with a set of index values; and wherein receiving the third information identifying the configuration comprises: receiving a parameter identifying an index value of the set of index values.

Aspect 22: The method of any of Aspects 15-21, further comprising: forwarding, between a network node and a user equipment (UE), one or more communications using the configuration based at least in part on transmitting the third information identifying the configuration to the repeater.

Aspect 23: The method of Aspect 22, wherein forwarding the one or more communications comprises: forwarding the one or more communications at a time based at least in part on an identified switching latency between a previous configuration and the configuration.

Aspect 24: The method of any of Aspects 15-23, further comprising: transmitting fourth information identifying the configuration to a user equipment (UE).

Aspect 25: The method of any of Aspects 15-24, wherein the first information includes a suggestion of the configuration.

Aspect 26: The method of any of Aspects 15-25, further comprising: receiving fourth information associated with switching configurations, wherein the fourth information is associated with one or more switching rules to enable autonomous switching of configurations without explicit signaling; and switching configurations based at least in part on the one or more switching rules.

Aspect 27: A method of wireless communication performed by a user equipment (UE), comprising: transmitting, to a network node and via a repeater, at least one of: first information identifying a set of supported configurations of the repeater, the first information including resource information for the set of supported configurations, or second information identifying a set of measurements of a network, the set of measurements being associated with use, on the network, of the set of supported configurations; and communicating in the network using a configuration of the set of supported configurations and using the repeater, the configuration being based at least in part on the resource information and the set of measurements.

Aspect 28: The method of Aspect 27, wherein the first information includes information identifying at least one of: a receive beamforming configuration, a transmit beamforming configuration, a multi-beam configuration, an antenna configuration, a multi-band operation configuration, a power state configuration, or a processing configuration.

Aspect 29: The method of any of Aspects 27-28, wherein the resource information includes at least one of power consumption information or provider information.

Aspect 30: The method of any of Aspects 27-29, wherein the resource information includes one or more parameters having at least one of: a relative value, an absolute value, a value within a range, or an indication of a change to a value over a period of time.

Aspect 31: The method of any of Aspects 27-30, wherein the resource information is associated with at least one of: a set of time resources, a set of frequency resources, or a set of spatial resources.

Aspect 32: The method of any of Aspects 27-31, wherein the resource information is associated with a contractual agreement.

Aspect 33: The method of any of Aspects 27-32, wherein the set of supported configurations is associated with a set of index values; and further comprising: receiving a parameter identifying an index value of the set of index values.

Aspect 34: The method of any of Aspects 27-33, wherein the first information includes a suggestion of the configuration.

Aspect 35: The method of any of Aspects 27-34, further comprising: receiving fourth information associated with switching configurations, wherein the fourth information is associated with one or more switching rules to enable autonomous switching of configurations without explicit signaling; and switching configurations based at least in part on the one or more switching rules.

Aspect 36: An apparatus for wireless communication at a device, comprising a processor; memory coupled with the processor; and instructions stored in the memory and executable by the processor to cause the apparatus to perform the method of one or more of Aspects 1-35.

Aspect 37: A device for wireless communication, comprising a memory and one or more processors coupled to the memory, the one or more processors configured to perform the method of one or more of Aspects 1-35.

Aspect 38: An apparatus for wireless communication, comprising at least one means for performing the method of one or more of Aspects 1-35.

Aspect 39: A non-transitory computer-readable medium storing code for wireless communication, the code comprising instructions executable by a processor to perform the method of one or more of Aspects 1-35.

Aspect 40: A non-transitory computer-readable medium storing a set of instructions for wireless communication, the set of instructions comprising one or more instructions that, when executed by one or more processors of a device, cause the device to perform the method of one or more of Aspects 1-35.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
   one or more memories; and
   one or more processors, coupled to the one or more memories, configured to:
      receive first information identifying a set of supported configurations for a set of repeaters, the first information including resource information for the set of supported configurations, and the set of support configurations being associated with a set of index values;
      receive second information identifying a set of measurements of a network, the set of measurements being associated with use, on the network, of the set of supported configurations; and
      transmit, to a repeater of the set of repeaters, third information identifying a configuration, of the set of supported configurations, that the repeater is to use for communication in the network, the configuration being based at least in part on the resource information and the set of measurements,
      wherein the one or more processors, to transmit the third information identifying the configuration, are configured to:
         transmit a parameter identifying an index value of the set of index values.

2. The network node of claim 1, wherein the first information includes information identifying at least one of:
   a receive beamforming configuration,
   a transmit beamforming configuration,
   a multi-beam configuration,
   an antenna configuration,
   a multi-band operation configuration,
   a power state configuration, or
   a processing configuration.

3. The network node of claim 1, wherein the resource information includes at least one of power consumption information or provider information.

4. The network node of claim 1, wherein the resource information includes one or more parameters having at least one of:
   a relative value,
   an absolute value,
   a value within a range, or
   an indication of a change to a value over a period of time.

5. The network node of claim 1, wherein the resource information is associated with at least one of: a set of time resources, a set of frequency resources, or a set of spatial resources.

6. The network node of claim 1, wherein the resource information is associated with a contractual agreement.

7. The network node of claim 1, wherein the one or more processors are further configured to:
   communicate using the repeater and the configuration based at least in part on the third information being transmitted.

8. The network node of claim 7, wherein the one or more processors, to communicate, are configured to:
   communicate at a time based at least in part on an identified switching latency between a previous configuration and the configuration.

9. The network node of claim 1, wherein the one or more processors are further configured to:
   transmit fourth information identifying the configuration to a user equipment (UE); and
   communicate with the UE, via the repeater, using the configuration.

10. The network node of claim 1, wherein the one or more processors are further configured to:
    perform an optimization procedure across the set of repeaters; and
    select the configuration for the repeater based at least in part on a result of performing the optimization procedure and the set of supported configurations.

11. The network node of claim 1, wherein the network node is a control entity residing at one of:
    a network-side device,
    a user equipment (UE),
    a particular repeater of the set of repeaters,
    a standalone control node, or
    a cloud service node.

12. The network node of claim 1, wherein the first information includes a suggestion of one or more configurations of the set of supported configurations; and
    wherein the one or more processors are further configured to:
       select the configuration based at least in part on the suggestion of the one or more configurations.

13. The network node of claim 1, wherein the one or more processors are further configured to:
    provide fourth information associated with switching configurations, wherein the fourth information is associated with one or more switching rules to enable autonomous switching of configurations without explicit signaling.

14. A repeater for wireless communication, comprising:
    one or more memories; and one or more processors, coupled to the one or more memories, configured to:
transmit first information identifying a set of supported configurations, the first information including resource information for the set of supported configurations, and the set of support configurations being associated with a set of index values;
transmit second information identifying a set of measurements of a network, the set of measurements being associated with use, on the network, of the set of supported configurations; and
receive third information identifying a configuration, of the set of supported configurations, to use for communication in the network, the configuration being based at least in part on the resource information and the set of measurements,
wherein the one or more processors, to receive the third information identifying the configuration, are configured to:
receive a parameter identifying an index value of the set of index values.

15. The repeater of claim 14, wherein the first information includes information identifying at least one of:
a receive beamforming configuration,
a transmit beamforming configuration,
a multi-beam configuration,
an antenna configuration,
a multi-band operation configuration,
a power state configuration, or
a processing configuration.

16. The repeater of claim 14, wherein the resource information includes at least one of power consumption information or provider information.

17. The repeater of claim 14, wherein the resource information includes one or more parameters having at least one of:
a relative value,
an absolute value,
a value within a range, or
an indication of a change to a value over a period of time.

18. The repeater of claim 14, wherein the resource information is associated with at least one of: a set of time resources, a set of frequency resources, or a set of spatial resources.

19. The repeater of claim 14, wherein the resource information is associated with a contractual agreement.

20. The repeater of claim 14, wherein the one or more processors are further configured to:
forward, between a network node and a user equipment (UE), one or more communications using the configuration based at least in part on the third information being received.

21. The repeater of claim 20, wherein the one or more processors, to forward the one or more communications, are configured to:
forward the one or more communications at a time based at least in part on an identified switching latency between a previous configuration and the configuration.

22. The repeater of claim 14, wherein the one or more processors are further configured to:
transmit fourth information identifying the configuration to a user equipment (UE).

23. A user equipment (UE) for wireless communication, comprising:
one or more memories; and
one or more processors, coupled to the one or more memories, configured to:
transmit, to a network node and via a repeater:
first information identifying a set of supported configurations of the repeater, the first information including resource information for the set of supported configurations, and the set of support configurations being associated with a set of index values, and
second information identifying a set of measurements of a network, the set of measurements being associated with use, on the network, of the set of supported configurations; and
communicate in the network using a configuration of the set of supported configurations and using the repeater, the configuration being based at least in part on the resource information and the set of measurements, and
wherein the one or more processors, to communicate, are configured to:
communicate at a time based at least in part on an identified switching latency between a previous configuration and the configuration.

24. The UE of claim 23, wherein the first information includes information identifying at least one of:
a receive beamforming configuration,
a transmit beamforming configuration,
a multi-beam configuration,
an antenna configuration,
a multi-band operation configuration,
a power state configuration, or
a processing configuration.

25. The UE of claim 23, wherein the resource information includes at least one of power consumption information or provider information.

26. The UE of claim 23, wherein the resource information includes one or more parameters having at least one of:
a relative value,
an absolute value,
a value within a range, or
an indication of a change to a value over a period of time.

27. The UE of claim 23, wherein the resource information is associated with at least one of: a set of time resources, a set of frequency resources, or a set of spatial resources.

28. A method of wireless communication performed by a network node, comprising:
receiving first information identifying a set of supported configurations for a set of repeaters, the first information including resource information for the set of supported configurations, and the set of support configurations being associated with a set of index values;
receiving second information identifying a set of measurements of a network, the set of measurements being associated with use, on the network, of the set of supported configurations; and
transmitting, to a repeater of the set of repeaters, third information identifying a configuration, of the set of supported configurations, that the repeater is to use for communication in the network, the configuration being based at least in part on the resource information and the set of measurements,
wherein transmitting the third information identifying the configuration comprises:
transmitting a parameter identifying an index value of the set of index values.

29. The method of claim 28, further comprising:
communicating using the repeater and the configuration based at least in part on transmitting the third information identifying the configuration.

30. The method of claim 29, wherein communicating using the repeater and the configuration comprises:
 communicating at a time based at least in part on an identified switching latency between a previous configuration and the configuration.

* * * * *